(No Model.)
H. C. JAMES & C. A. DELAVAN.
DEVICE FOR SUPPORTING HARNESS.
No. 364,652. Patented June 14, 1887.
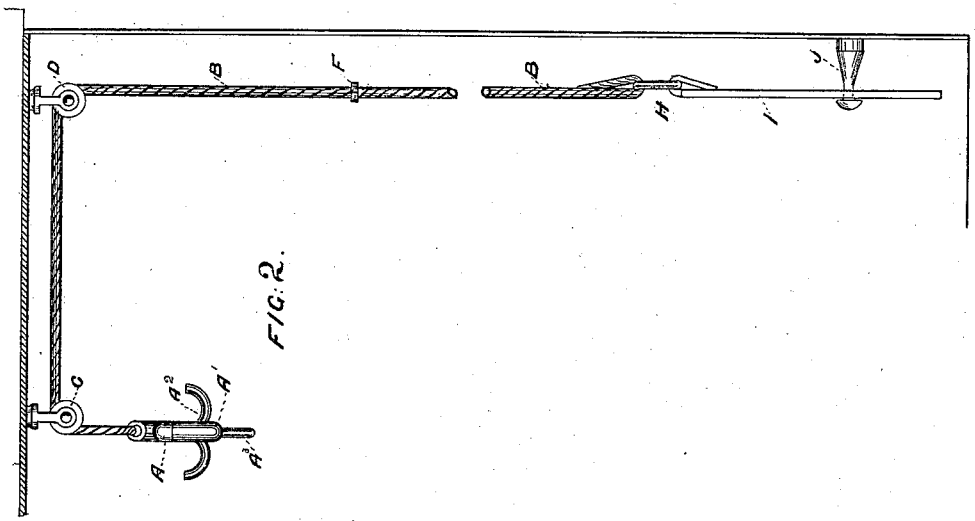
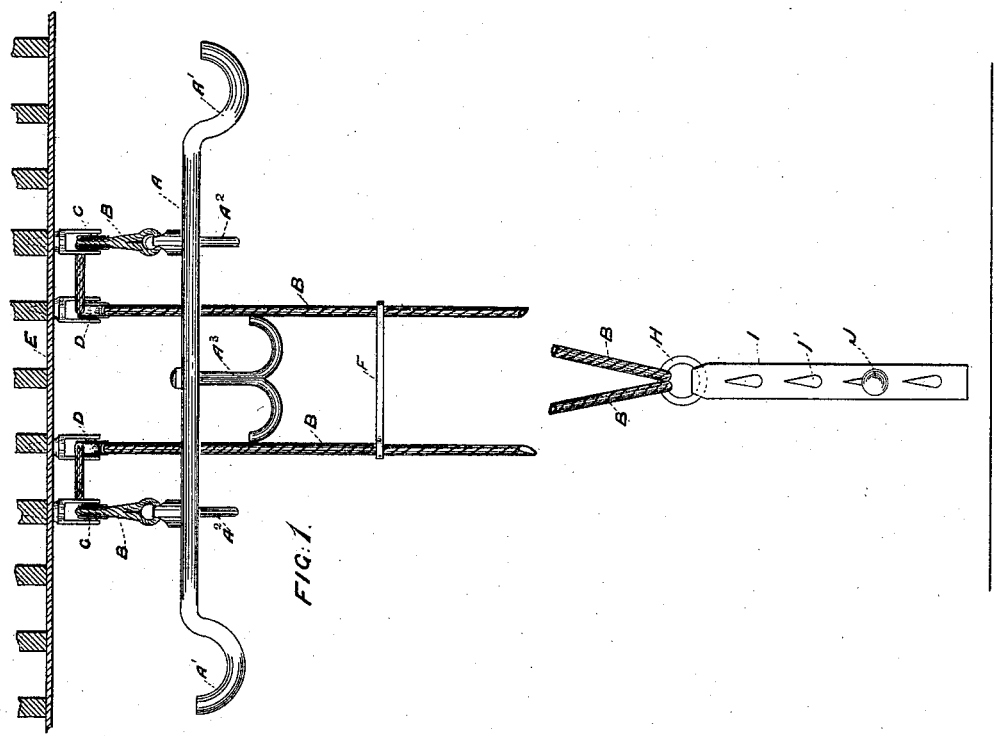
WITNESSES:
Johann R. Howze
Harris M. Allen
INVENTORS
Harry C. James
Charles A. Delavan
BY O'Brien & Co
their ATTORNEYS,
N. PETERS, Photo-Lithographer, Washington, D. C.

UNITED STATES PATENT OFFICE.

HARRY C. JAMES AND CHARLES A. DELAVAN, OF DENVER, COLORADO.

DEVICE FOR SUPPORTING HARNESS.

SPECIFICATION forming part of Letters Patent No. 364,652, dated June 14, 1887.

Application filed February 14, 1887. Serial No. 227,474. (No model.)

*To all whom it may concern:*

Be it known that we, HARRY C. JAMES and CHARLES A. DELAVAN, both citizens of the United States, residing at Denver, in the county of Arapahoe and State of Colorado, have invented a new and useful Device for Supporting Harness, of which the following is a specification, reference being had therein to the accompanying drawings, in which similar letters refer to corresponding parts.

Our invention relates to harness-supporting devices; and it consists of a bar provided with hooks, said bar being supported by cords running over pulleys attached to the ceiling of the barn in such a manner that the height of the bar above the floor of the barn may be regulated as desired, as hereinafter more fully described and claimed.

In the drawings, Figures 1 and 2 are front and side elevations, respectively, of our improved device, the cords being shown broken in each figure to indicate that they may be of any desired length.

A is a bar provided with hooks $A'$ $A'$, $A^2$ $A^2$, and $A^3$. Bar A is suspended by means of cords B B, attached thereto by suitable means and in such a manner as to hold it in a horizontal position. Cords B pass over pulleys C C and D D, attached to the ceiling E or cross-beams of the barn by suitable means, as shown in Fig. 1. Cords B pass downward and are connected at a suitable distance from the pulleys by the bar F, which holds the cords parallel to each other between the bar F and pulleys D. Below bar F cords B are attached to ring H.

I is a strap attached to ring H, and provided with holes $I'$, by means of which it may be attached to button J, which is fastened to the side of the barn at any convenient point.

The hooks $A^2$ $A^2$ and $A^3$ have each two prongs, as shown in the drawings.

In the use of our improved device the hames of the harness may be hung over either of the hooks $A'$ $A'$, the tugs stretched across the hooks $A^2$ $A^2$, and the crupper hung upon the other hook $A'$. The bridle and collar may be hung upon the hook $A^3$, one on each prong, said hook being attached to bar A lower than hooks $A^2$, so that it will not interfere with the parts of the harness placed upon hooks $A^2$.

Our improved device is specially valuable for supporting harness which has become wet and dirty from use. By the use of our device all the parts of the harness are kept straight and in their proper shape, and are easily cleaned and oiled while hanging upon our supporter, thus obviating the necessity of taking the harness apart for oiling, as is usually done.

Having thus fully described our invention, what we claim, and desire to secure by Letters Patent, is—

1. In a harness supporter, a horizontal bar provided with hooks $A'$ and double-pronged hooks $A^2$ and $A^3$, in combination with suitable cords passing over pulleys fastened above the bar and thence hanging down, their lower extremities being attached to a strap, I, provided with button-holes, substantially as described, and for the purpose set forth.

2. In a device for supporting harness, horizontal bar A, provided with hooks $A'$, $A^2$, and $A^3$, in combination with cords B B, pulleys C and D, bar F, hand-strap I, and button J, substantially as described, and for the purpose set forth.

HARRY C. JAMES.
CHARLES A. DELAVAN.

In presence of—
F. H. JOHNSON,
ISHAM R. HOWZE.